(12) United States Patent
Osborn et al.

(10) Patent No.: US 7,254,747 B2
(45) Date of Patent: Aug. 7, 2007

(54) COMPLEX SYSTEM DIAGNOSTIC SERVICE MODEL SELECTION METHOD AND APPARATUS

(75) Inventors: Mark David Osborn, Schenectady, NY (US); Rasiklal Punjalal Shah, Latham, NY (US); Jieqian Cathy Chen, Palo Alto, CA (US)

(73) Assignee: General Electric Company, Niskayuna, NY (US)

( * ) Notice: Subject to any disclaimer, the term of this patent is extended or adjusted under 35 U.S.C. 154(b) by 845 days.

(21) Appl. No.: 10/402,874

(22) Filed: Mar. 28, 2003

(65) Prior Publication Data

US 2004/0205398 A1    Oct. 14, 2004

(51) Int. Cl.
    *G06F 11/00*    (2006.01)
(52) U.S. Cl. .......................................... 714/37
(58) Field of Classification Search ............. 714/37, 714/38, 39, 40, 47; 705/2, 7, 14
    See application file for complete search history.

(56) References Cited

U.S. PATENT DOCUMENTS

| 6,430,276 | B1* | 8/2002 | Bouvier et al. ......... 379/121.01 |
| 6,675,149 | B1* | 1/2004 | Ruffin et al. .................... 705/8 |
| 2003/0028390 | A1* | 2/2003 | Stern et al. ..................... 705/1 |
| 2003/0101076 | A1* | 5/2003 | Zaleski ........................... 705/2 |
| 2004/0010446 | A1* | 1/2004 | Vanska et al. ................. 705/14 |
| 2004/0172581 | A1* | 9/2004 | Tamura et al. ............... 714/718 |

* cited by examiner

*Primary Examiner*—Nadeem Iqbal
(74) *Attorney, Agent, or Firm*—Jean K. Testa; Curtis B. Brueske

(57) ABSTRACT

A technique is provided for selecting among a plurality of service models for addressing serviceable events and faults in a complex machine system. Indicators established for each of the models serve as the basis for comparison to input data acquired from the complex system or from manual or semi-automated data acquisition methods. Based upon the comparisons, and upon flexible selection criteria, one or more of the service models is selected to most efficiently address the most likely root cause of the serviceable event or fault.

38 Claims, 11 Drawing Sheets

Extended FMEA

Modality: CT
System Model #: CT-Model1
Subsystem: M1-Subsystem1
Component: S1-Component1
Version: 1
Revision Notes:

| Item | | Failure/Mode | | | Service Action | | | Indicator | | | |
|---|---|---|---|---|---|---|---|---|---|---|---|
| Item | Probability Item is problem given Component | Name | Severity | Probability Failure Mode is problem given Item | Action | ICV($) | Notes | Message Id | Source | Name | Acquisition Time (mins) | Type |
| Item1 | 50% | Fm1 | 5 | 50% | Svc Action1 | $100 | | 1001 | Log1 | Ind1 | 0 | Runtime |
| Item1 | 50% | Fm2 | 4 | 25% | Svc Action2 | $200 | | | | Ind2 | 20 | User Initiated |
| Item1 | 50% | Fm3 | 4 | 25% | Svc Action3 | $25 | | | | Ind3 | 30 | User Initiated |
| Item2 | 50% | Fm4 | 5 | 20% | Svc Action4 | $100 | | 1004 | Log1 | Ind4 | 0 | Runtime |
| Item2 | 50% | Fm5 | 4 | 20% | Svc Action5 | $200 | | | | Ind5 | 20 | Manual |
| Item2 | 50% | Fm6 | 4 | 20% | Svc Action6 | $50 | | | | Ind6 | 30 | Manual |
| Item2 | 50% | Fm7 | 5 | 20% | Svc Action7 | $200 | | 1007 | Log1 | Ind7 | 0 | Runtime |
| Item2 | 50% | Fm8 | 4 | 10% | Svc Action8 | $200 | | 1007 | Log1 | Ind7 | 0 | Runtime |
| Item2 | 50% | Fm9 | 4 | 10% | Svc Action9 | $50 | | | | Ind3 | 30 | User Initiated |

Service FISA

- Modality: CT
- System Model #: Ct-Model1
- Subsystem: M1-Subsystem1
- Component/Version: S1-Component1 / 1
- Revision Notes:

| | | | | | Service Action ICV ($) Notes | SVC Action1 $100 | SVC Action2 $200 | SVC Action3 $25 | SVC Action4 $100 | SVC Action5 $200 | SVC Action6 $50 | SVC Action7 $200 | SVC Action8 $200 | SVC Action9 $50 |
|---|---|---|---|---|---|---|---|---|---|---|---|---|---|---|
| | | | | | Failure Mode Severity | Fm1 / 5 | Fm2 / 4 | Fm3 / 4 | Fm4 / 5 | Fm5 / 4 | Fm6 / 4 | Fm7 / 5 | Fm8 / 4 | Fm9 / 4 |
| | | | | | Probability Failure Mode is problem given Item | 50% | 25% | 25% | 20% | 20% | 20% | 20% | 10% | 10% |
| | | | | | Item / Probability Item is problem given Component | Item1 / 50% | Item1 / 50% | Item1 / 50% | Item2 / 50% | Item2 / 50% | Item2 / 50% | Item2 / 50% | Item2 / 50% | Item2 / 50% |
| | | | | | Probability Failure Mode is problem given Component | 25% | 13% | 13% | 10% | 10% | 10% | 10% | 5% | 5% |
| Message ID | Indicators Source | Name | Acquisition Time (mins) | Type | Notes | | | | | | | | | |
| 1001 | Log1 | Ind1 | 0 | Runtime | | X | | | | | | | | |
| | | Ind2 | 20 | User Initiated | | | X | | | | | | | |
| | | Ind3 | 30 | User Initiated | | | | X | | | | | | |
| 1004 | Log1 | Ind4 | 0 | Runtime | | | | | X | | | | | |
| | | Ind5 | 20 | Manual | | | | | | X | | | | |
| | | Ind6 | 30 | Manual | | | | | | | X | | | |
| 1007 | Log1 | Ind7 | 0 | Runtime | | | | | | | | X | X | X |

| URL | | | | | | | | | Logged in as : XXXXXX |
|---|---|---|---|---|---|---|---|---|---|

Causality Engine

Service Feedback Summary Scorecard

Model Summary:
- Modality: CT
- Model: CT-Model1
- Subsystem: M1-Subsystem1
- Function: S1-Component1

Date Range:
From: Date 1
To: Date 2

| Date | Dispatch | Action | Failure Mode | Correct? | Correct Action | 1001 | 1004 | 1007 | 200109110 | Ind 2 | Ind 3 | Ind 5 | Ind 6 |
|---|---|---|---|---|---|---|---|---|---|---|---|---|---|
| Wed Mar 19 13:23:53 EST 2003 | 343434 | Svc Action 1 | FM 1 | Y | | True | False | False | True | False | False | False | False |
| Wed Mar 19 13:24:09 EST 2003 | 2342324 | Svc Action 1 | FM 1 | N | Svc Action 3 | True | True | True | True | False | False | False | False |
| Wed Mar 19 13:24:13 EST 2003 | 757576 | Svc Action 1 | FM 1 | Y | | True | True | True | True | True | True | True | True |

FIG. 11

COMPLEX SYSTEM DIAGNOSTIC SERVICE MODEL SELECTION METHOD AND APPARATUS

BACKGROUND OF THE INVENTION

The present invention relates generally to the field of mechanisms for identifying faults and serviceable conditions in complex systems. More particularly, the invention relates to techniques for improving detection, isolation and servicing of failures or serviceable events, and serviceability models used in detecting and correcting failures and serviceable events.

In a field of complex machine systems, various techniques have been employed for detecting faults or serviceable conditions and for correcting them. Early techniques were simply reactive and manual in character. That is, as a fault condition or failure occurred, technicians or service personnel carried out manual troubleshooting operations to identify where the fault may have occurred and correct the malfunction. Such systems, while adequate on simple systems generally, do not provide a highly reliable and extendable service strategy. Moreover, such approaches rely upon the experience level, skill, intuition and knowledge of human technicians and service personnel, which may very greatly both between individuals and over time.

Approaches have been made to more analytically and repeatably identify faults and serviceable conditions in reactive and proactive manners. However, existing approaches do not typically benefit from a systematic strategy for establishing a serviceability model or system, implementing the model or system, and correcting the model and system following implementation. There is a significant need, therefore, for improved systems designed to provide service to complex systems. There is a particular need for an overall service strategy approach which can be applied to complex machine systems of a wide range of types, that include many different subsystems, components, functions, field replaceable units, and so forth. The art has not as yet successfully developed a comprehensive approach to serviceability design, implementation and improvement.

BRIEF DESCRIPTION OF THE INVENTION

The present invention provides a novel technique for selecting among a plurality of service models designed to respond to such needs. In a collection of large number of models, one or more such models may be selected to most accurately address which component, function, subsystem, field replaceable unit, and so forth in a complex system may be the root cause of a serviceable event or fault. Indicators may be compared to input from the system to serve as the basis for proper selection of a model which defines recommended service actions. Various flexible criteria may be employed for the selection of the appropriate model, and such criteria may be changed over time in a flexible manner so as to improve performance of the overall service ability system.

In accordance with one aspect of the present technique, a method is provided for selecting a service model from a plurality of service models. In accordance with the method, input data is accessed from a plurality of components of a complex system in response to a serviceable event. The input data is compared to corresponding indicators from a plurality of service models for the plurality of components. A service model is selected from the plurality of models for determination of a service action on a corresponding of one of the components in response to the serviceable event based upon the comparison.

In accordance with a further aspect of the technique, a method is provided for selecting a service model that includes accessing input data from a plurality of components of a complex system in response to a serviceable event. The input data is again compared with corresponding indicators of a plurality of service models for the plurality of components. A service model is selected from the plurality of models for determination of a service action on a corresponding one of the components in response to the serviceable event based upon a number of matches between the input data and indicators for each of the service models.

In another method offered by the invention, input data is accessed from a plurality of components of a complex system in response to a serviceable event. The input data is compared to corresponding indicators for a plurality of service models for a plurality of components. A service model is selected from the plurality of models for determination of a service action on a corresponding one of the components in response to the serviceable event based upon a number of matches between the input data and indicators for each of the service models. To recommended service action is then identified based upon the selected model.

The invention also provides novel systems and computer programs for carrying out similar functionalities to those offered by the methods described above.

BRIEF DESCRIPTION OF THE DRAWINGS

The foregoing and other advantages and features of the invention will become apparent upon reading the following detailed description and upon reference to the drawings in which:

FIG. 6 is an illustration of an exemplary interface for designing a model for servicing in accordance with the components summarized in FIG. 3;

FIG. 7 is a further exemplary interface for designing the model in an alternative fashion, which may be used in conjunction with that of FIG. 6;

FIG. 11 is a scorecard similar to that of FIG. 10, but providing additional detail in individual events that led to servicing on which the scorecard is based.

DETAILED DESCRIPTION OF SPECIFIC EMBODIMENTS

Figure 1:
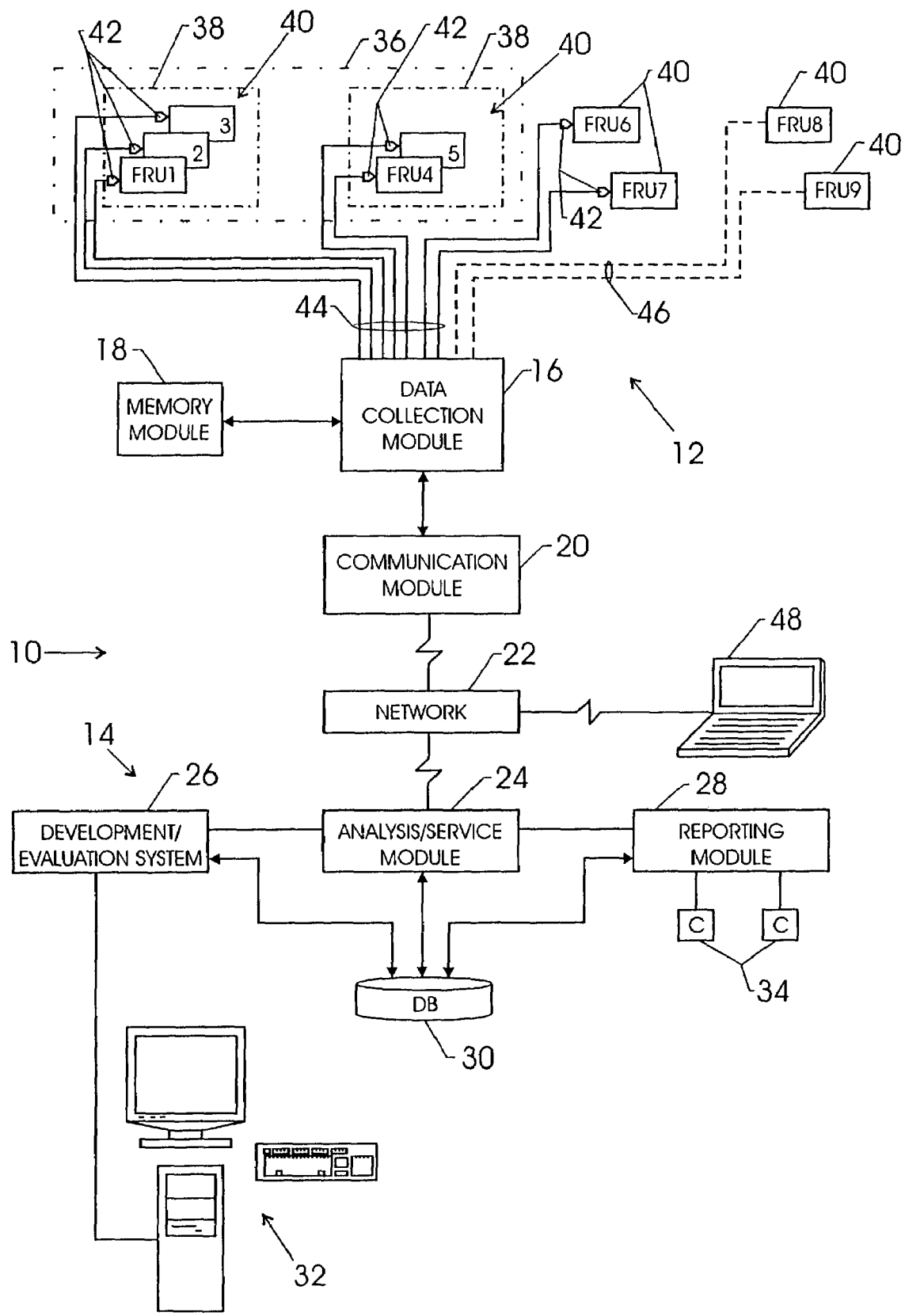
FIG. 1 is a diagrammatical representation of a service system designed to provide modeling of certain fault conditions or events in a complex machine system in accordance with aspects of the present technique.

Turning now to the drawings, and referring first to FIG. 1, a service system 10 is illustrated diagrammatically for evaluating performance and providing recommendations for and service to a complex machine system 12. Throughout the present discussion, reference will be made to a machine system 12, and to service for such a machine system. Many different environments may benefit from aspects of the present technique, but the technique is particularly well-suited to evaluating functions and components, including systems, subsystems, field replaceable units, and so forth as described below, of an complex machine system. By the term complex machine system, it should be understood that the present technique is not limited to conventional mechanical devices, although such devices and systems may, of course, be evaluated and serviced by the present techniques. Rather, the term should be understood to include any complex system of components, functions, subsystems, field replaceable units, both stationary and mobile, and supported in hardware, software, firmware, or in any other manner. At points through the present discussion reference will be made, for example, to imaging systems, such as those used in a medical diagnostics context. As will be appreciated by those skilled in the art, such systems include a plethora of subsystems and components which should function within certain parameters to provide the desired operability. In a medical diagnostics context, for example, various modality systems are employed, such as magnetic resonance imaging systems, computed tomography systems, X-ray systems, ultrasound systems, positron emission tomography systems, and so forth. These and other systems may be modeled in accordance with the present techniques and serviced to maintain their functionality and operability.

As described more fully below, the system 10 includes a model design and implementation system, represented generally by reference numeral 14. The model design and implementation system provides for development of specific service models for the complex machine system and subsystems thereof. The models may be tested for completeness, accuracy, repeatability, detectability of certain failure modes, and so forth as also described more fully below. The model design and implementation system 14 also provides for actual implementation of the service models developed. During such implementation, information will be gathered through various means, either automated or manual, and one or more service models will be automatically selected for determining recommended courses of action in providing service to the identified systems, subsystems, components or functionalities. The system 14 also provides for periodic analysis over the lifetime of the system to evaluate the effectiveness of the service model implemented. That is, as more detailed or empirical information becomes available as to the service needed for the system, such information is integrated into the models to improve their accuracy and performance in predicting and responding to serviceable conditions and events as they occur or prior to their occurrence.

The complex machine system 12 is served by a data collection module, which may take any suitable form. In general, the data collection module 16 may include software, hardware, or firmware, which automatically or manually collects data points, parameter values, event logs, and so forth required for evaluation of the operating state of the machine system. The data collection module may collect such data in realtime, periodically during automatically or manually-initiated data sweeps, or in any other suitable fashion. The collected data may be stored in a memory module 18. Both the data collection module 16 and the memory module 18 may either be local to the machine system 12 or at one or more remote locations. The data collection module is coupled to a communications module 20 which facilitates transmission of data to and from the data collection module and thereby to and from the memory module 18 and the complex machine system 12. The communications module 20 may include one or more different types of data transmission media and may operate in accordance with any desired protocol, such as Internet protocols. Accordingly, the communications module 20 may include routers, servers, firewalls, security devices, and any other desired circuitry for the transmission and security of the transmitted data. A network 22 facilitates exchange of the data between the communications module 20 and the model design implementation system 14.

The model design implementation system 14 may include a range of computer resources and circuits at one or many locations. In particular, it should be understood that the system 14 provides a wide range of functionality both in the design of service models, in their testing, in their implementation, and in their eventual evaluation and refinement. Accordingly, while certain systems and modules will be described herein in a diagrammatical or analytical sense, those skilled in the art will appreciate that these modules may have many routines and functions imbedded within them, some of which will be described herein, and may perform these functions in many ways over networks, at local workstations, through interactive computing resources, and so forth.

As illustrated in FIG. 1, model design and implementation system 14 includes an analysis/service module 24, which receives information via network 22 from the machine system 12. Module 24, which may again include various software routines and hardware or firmware circuits, serves to analyze the received data and to prompt transmission of required data for the model development, model implementation, and model refinement functions performed by the system. Module 24 is linked to a development/evaluation system 26 which serves to aid in development of service modules for the machine system and in their evaluation and refinement. Various reporting modules, described in greater detail below and represented generally by reference numeral 28 in FIG. 1, are provided to generate reports during all phases of operation of system 14. For example, the reporting modules provide reports of evaluations made of certain models during design phases, as well as reports and recommendations for servicing during the actual implementation of the models. Moreover, the reporting modules 28 may provide reports indicative of the actual performance of the models over time based upon actual servicing of the system. These and other reports may be provided by the system periodically or at user requests. Module 24, system 26 and reporting modules 28 may be linked to a database 30 or any other suitable memory device. In general, while database 30 is illustrated in FIG. 1 for explanatory purposes, in actual implementation, the systems and modules will each include separate memory for carrying out their functions, for storing parameters and data, for storing models, for storing service requests, for storing service recommendations and service histories, and so forth. Such memories may be of any suitable type, and further memories and databases may be provided in a linked fashion so as to facilitate the exchange of the data, archiving of data, and so forth. In actual implementation, for example, it will likely be common to provide a number of different memory locations storing software and data for performing the various individual functions described below. It is also anticipated that such memory may be linked or made redundant so as to facilitate online or offline operation of certain of the functional components and functionalities described herein. Accordingly, as represented in FIG. 1, a workstation 32 is linked to the development/evaluation system 26, and includes a computer, monitor, input devices, output devices, and so forth in a conventional manner. Similar workstations may be linked to system 26, to module 24, to reporting modules 28, and to other components provided in the model design and implementation system 14, as represented generally by reference numeral 34 for individual clients or workstations.

As mentioned above, the complex machine system 12 may include a great number of components and functions, as well as subsystems, field replaceable units, and so forth. Certain of these features are illustrated in FIG. 1. In the illustrated system 12, a subsystem 36 includes various components or functions 38. The components or functions each include field replaceable units 40. It should be noted that as used herein, the term field replaceable unit may include various components or parts, as well as collections of components or parts that may carry out useful functions either in cooperation with one another or somewhat separately. As will be appreciated by those skilled in the art, where desired, any number of subsystems may be designated and are typically designated in complex systems by their functionality, interdependence, separate manufacture ability or service ability, and so forth. Field replaceable units, similarly, may be designed to facilitate servicing by simple replacement of packaged parts, routines, and so forth. As described more fully below, one aspect of the present technique affords the design or association of field replaceable units in accordance with detectability or isolation of service or fault conditions, cost of items which can be serviced or simply replaced, and so forth.

Certain components or functions of system 10 may not be included in associated field replaceable units or even in designated subsystems, components or functions, however. Illustrated in FIG. 1 are additional field replaceable units which are outside the logical association of the subsystem 36 and are not found in any specific components or functions. Similarly, although not specifically illustrated in FIG. 1, field replaceable units may be separate from individual subsystems, and so forth. It should be borne in mind that the various field replaceable units, components and functions, subsystems, and so forth may be found in a single or in multiple physical locations. That is, the system 12 is not limited to a particular physical location, but may include associated components, functions, subsystems, and so forth at various different locations.

The components and functions of system 12 are equipped for collection of data which is useful in identifying the operational state of the system and for identifying and diagnosing fault conditions. The collected data, as noted above, is used in conjunction with service models for the individual components or functions, or models for field replaceable units or even subsystems. First, however, data is detected or collected for application of the models. This function can be performed in many ways and will be performed in many ways on various distinct components and functions of the system.

In the embodiment illustrated in FIG. 1, sensors 42 are provided for the various field replaceable units, 40. The nature of the sensors will, of course, depend upon the nature of the individual parameter being detected. In general, parameters are detected that provide an indication of the operative state of the individual component or function. One or more sensors may perform this task, and the sensors may be dedicated to the task or may generally perform an operational function within the system. For example, dedicated transducers may be provided on components for detecting such parameters as current, voltage, temperature, speed, vibration, chemical properties, or any number of other operational parameters. Indicators for software operational status are also be considered as sensors in the present context. Where appropriate, the sensors may already be provided for performing such functions useful in the normal operation of the system. Where such parameters are needed and are not provided by the existing system components, the present technique provides for addition of such sensors to enhance the detectability and isolation capabilities afforded by the service models. It should also be noted that, while sensors are illustrated as associated with FRU's 40, such sensors, more generally, may be provided at various levels in the system, such as at component or function levels, subsystem levels, and so forth.

As described more fully below, certain parameters or observations may not be easily made in an automated fashion. Such inputs, rather, may require human or special machine intervention for detection purposes. Two of the field replaceable units 40 represented in FIG. 1 (see FRU8 and FRU9) are not equipped with sensors, but require such manual or semi-automated feedback. Accordingly, the sensors 42 illustrated in FIG. 1 are shown as providing data to the data collection module 16 via any suitable communication links 44, while dash lines 46 are illustrated to diagrammatically indicate that certain data or observations may be communicated in such manual or semi-automated manners. It should also be noted that on-demand diagnostics tests and routines may also provide indicator information for use by the models. As will be appreciated by those skilled in the art, many systems may be equipped with such routines that can be user-initiated for determining the operating state of the system or its component parts by collecting, and even analyzing parameter data either in real time, or from event logs and the like, or both. Similarly, a service workstation 48 or similar interface device may be linked to the system for providing data and observations which may serve as indicators used in the various service models discussed below. Such workstations 48 may also serve for requesting service, compiling or refining models, receiving or requesting reports and service recommendations, and so forth.

Figure 2:
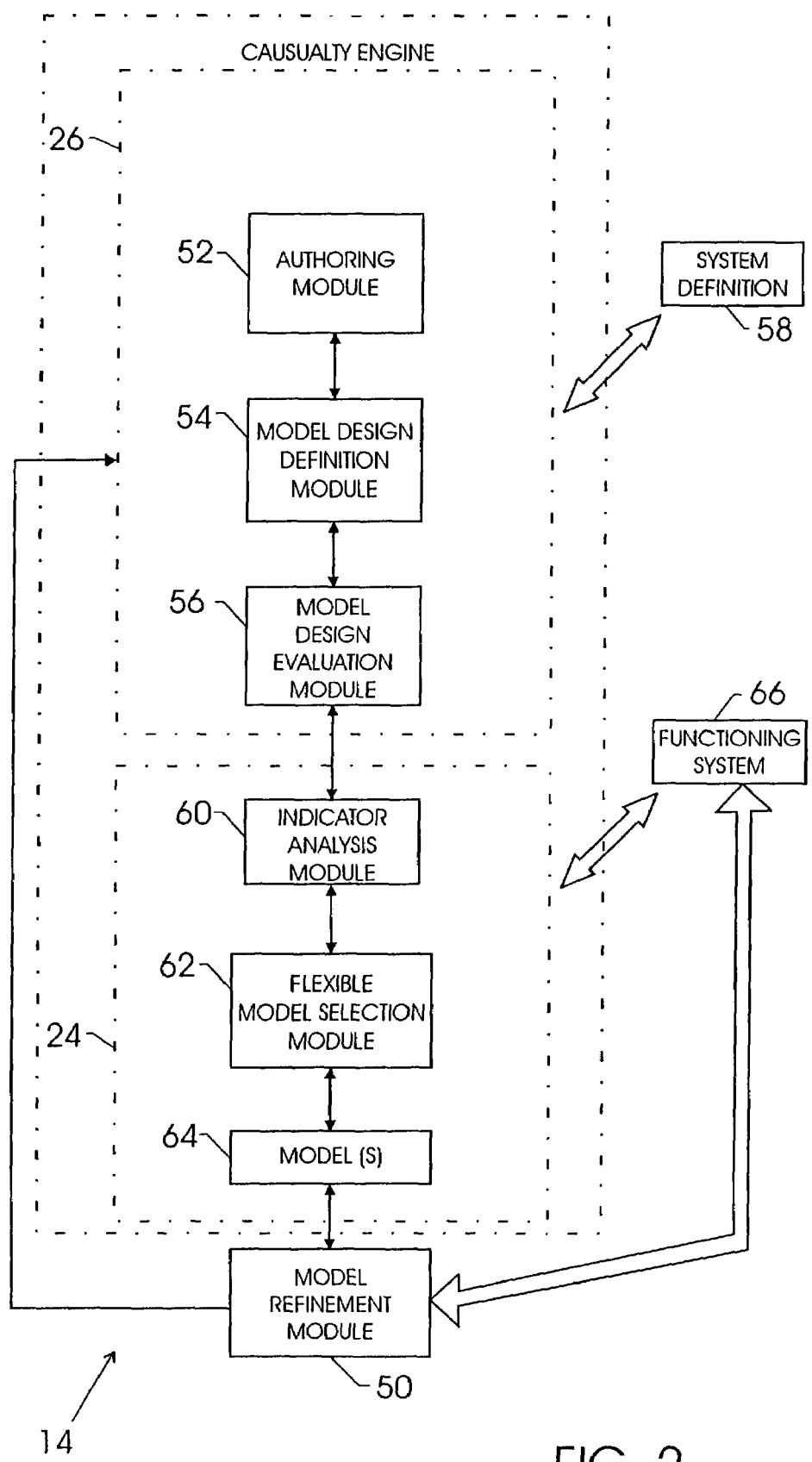
FIG. 2 is a diagrammatical representation of certain of the functional components of the model design and implementation system portion of the overall service system illustrated in FIG. 1.

FIG. 2 illustrates certain functional components of the model design and implementation system 14 discussed above. In particular, components of the development/evaluation system 26 are illustrated, as well as components of the analysis/service module 24. These components are shown equipped to exchange data with one another, and with a model refinement module 50. As discussed in greater detail below, the model refinement module 50 facilitates refinement of the service models based upon actual servicing experience for the complex machine system.

The development/evaluation system 26, which may incorporate components which, in a present embodiment are described as a causality engine, facilitate authoring of models, definition of models, and their refinement before implementation. In general, an authoring module 52 provides software and interfaces for facilitating the actual design of a service model, which can evaluate operational conditions of one or more components or functions of the machine system during use. The authoring module 52 is linked to a model creation module 54, which calls upon software for actually compiling the service model. The model creation module 54 is in turn linked a model design evaluation module 56, which serves to analyze the module for detectability and isolation of certain faults or failure modes as described more fully below. Modules 52, 54 and 56 will generally operate on the basis of a system definition as represented generally by reference numeral 58. The system definition may include specifications or definitions of individual field replaceable units, components, functions, subsystems, and so forth, both actually implemented in a machine system or in planning phases. As described more fully below, the modules of the development/evaluation system 26 facilitate the planning and design both of the service modules, as well as improvements in the actual system. That is, where certain faults or conditions cannot be accurately detected or isolated, additional sensors or indicators may be designated and provided.

The analysis/service module 24 effectively implements the service models developed by system 26. In essence, the module 24 includes an indicator analysis module 60, which receives and analyzes data. Because the data may include a vast array of data points, values, ranges, counts, and so forth, a flexible model selection module 62 is provided that selects one or more models for analysis in evaluating the potential need for service. As described more fully below, module 62 not only facilitates selection of one or more models, thereby focusing on one or more subsystem, component or function, field replaceable unit, and so forth, but module 62 also enables periodic updating or changing of criteria used for selection of the individual model or models. Based upon the operation of module 62, then, one or more models 64 are selected for analysis and for determining recommendations of the system. As compared to the system 26 which generally operates on a system definition 58, the modules and models of module 24 operate on data from a functioning system, as indicated generally by reference numeral 66 in FIG. 2.

As described more fully below, the model refinement module 50, which also operates on data from an actual functioning system 66 serves to determine the validity, accuracy, and the overall performance of one or more individual models. That is, based upon actual events and service performed on the system, the models developed through the use of system 26 and implemented by module 24 can be refined to provide enhanced functionality, reduced costs, provide greater reliability, provide for additional detectability and isolation of faults or serviceable conditions, and so forth.

Figure 3:
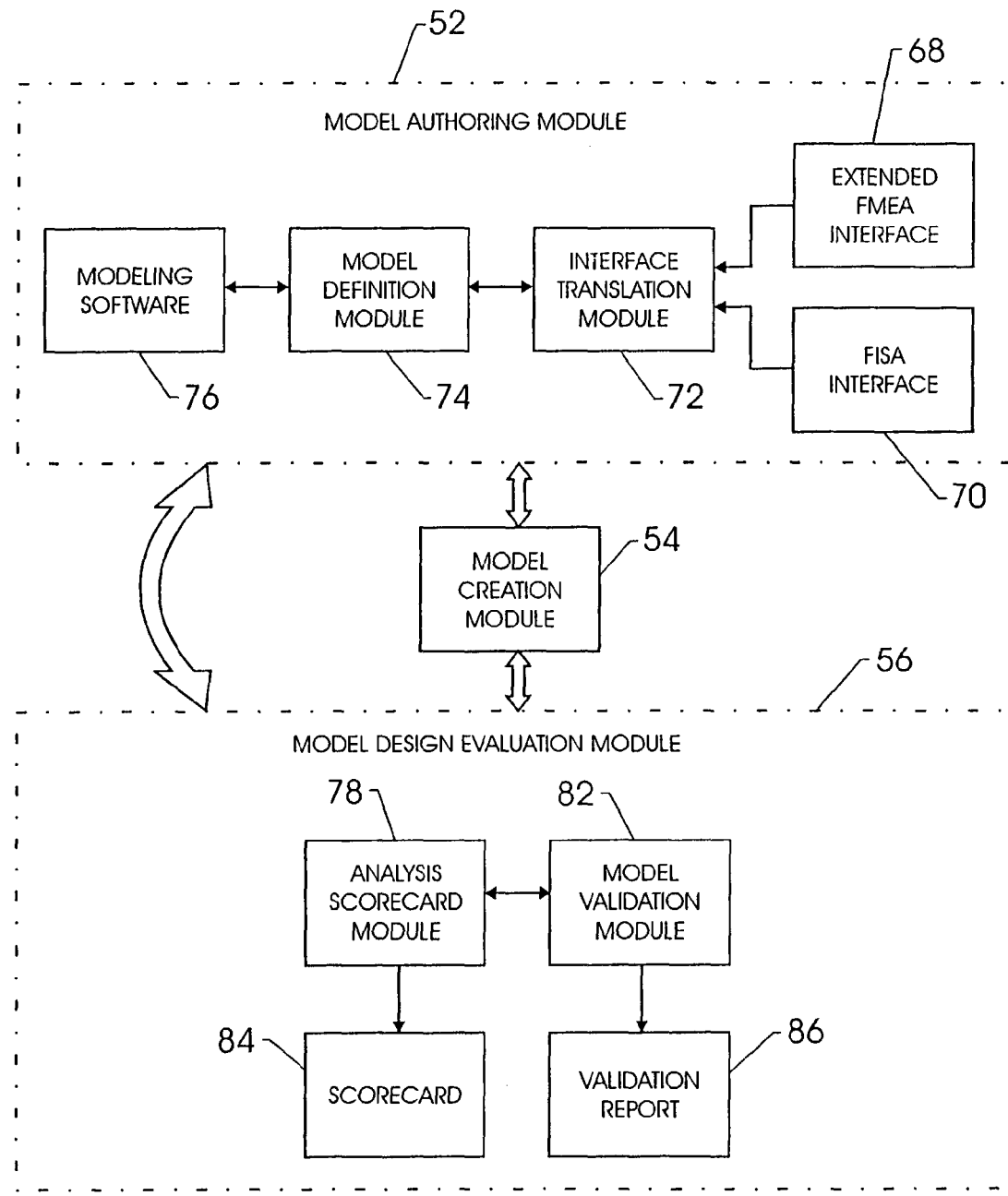
FIG. 3 is a diagrammatical representation of certain functional components in a development and evaluation system portion of the system illustrated in FIG. 2.

The general components illustrated in FIG. 2 as included in the development/evaluation system 26 are illustrated in greater detail in FIG. 3. Again, in the overall scheme of service modeling, and provision of services, in a present embodiment the development/evaluation system comes into play during the early stages of model development and continues through the actual implementation of the service model. The authoring module 52 provides for various types of interfaces which can be used by designers, developers, field engineers, and service personnel for analyzing and designing both the service models and the complex machine system itself to facilitate detection, isolation and servicing of faults and serviceable events. In particular, in a present embodiment, two different interfaces are provided in authoring module 52. These include an extended failure mode effect analysis (FMEA) which takes the form of a fairly straightforward and easy to understand computer interface and supporting software for defining individual aspects of the service model. As described in greater detail below with reference to FIG. 6, for example, the extended FMEA interface 68 allows for definition of the system, subsystem, component, and various items, failure modes, service actions and indicators corresponding to the items or failure modes. Similarly, one or more additional interfaces may be provided, such as a failure indicator and service actions (FISA) interface. This interface, or other interfaces, is particularly useful in providing a different format for inputting information similar to that found in the extended FMEA interface 68. Indeed, in the present embodiment, both interfaces permit definition of the same information, and simply provide different formats which can be more readily understood and utilized by different users.

An interface translation module 72 facilitates exchange of data between the interfaces 68 and 70. In particular, because the same or similar information is input via each interface, this information may be displayed and interacted with via the other interface, depending upon the available information or user preferences. The interface module, then, communicates with the model definition module 74. The model definition module draws upon modeling software 76 which may be commercially available, such as for compiling particular types of models. In a present embodiment, based upon the information input and accessible via the interfaces 68 and 70 coordinated via the interface translation module 72, the model definition module 74 implements software for defining a Bayesian network. Such software is commercially available from various sources, such as from Hugin Expert A/S of Denmark.

As will be noted in greater detail below with reference to FIGS. 6 and 7 illustrating the interfaces 68 and 70, a range of information is provided for the definition of each model. In a present embodiment, sufficient detail and definition are provided for detecting and isolating faults or serviceable events in individual field replaceable units, components or functions, or in individual serviceable subsystems. That is, at the model level, individual models, which may however, have some degree of interrelationship or interdependence, permit identification of which field replaceable unit, component, function, subsystem, or the like may be best targeted for addressing a particular service need as it arises.

The collection of models designed via the model authoring module 52 form a library of modules, such as a Bayesian network models 54. It should be noted that the Bayesian network described herein, corresponds to a special case of the model creation module 54 in FIG. 2. In fact, although the Bayesian network illustrated is preferred in the present embodiment, various other types of models, networks and the like may be employed. As will be appreciated by those skilled in the art, Bayesian networks provide certain facilities and advantages, such as the ability to identify potential events and their causes, along with statistical predictions or correlations between various events and causes.

The model design evaluation module 56 serves to evaluate the performance of each model developed by the authoring module 52 and forming part of the module 54 prior to application. In particular, the design evaluation module 56 assists in determining whether particular failure mode, events, serviceable conditions, and the like can be detected and isolated from one another. To provide the most efficient servicing of the complex system, it is desirable to enable the service system to detect the fault location of various serviceable events or malfunctions and to accurately and quickly direct service systems or service personnel to such causes. The evaluation of the cause and the determination of the recommendation, however, may be based upon a variety of criteria, such as minimization of downtime, minimization of cost, and so forth. The model design evaluation module 56 aids in providing feedback on the effectiveness of the models on such bases. An analysis scorecard module 78, therefore, serves to establish a scorecard or report such evaluation. Similarly, a diagnostic or validation model module 82 serves to simulate response of the model to serviceable events and to diagnose certain problems or areas for improvement of the model. In a present implementation, analysis scorecard module 78, then, produces a scorecard 84, while diagnostics or validation module 82 produces a validation report 86. More will be said of scorecard 84 and validation report 86 below in reference to FIGS. 8 and 9.

Figure 4:
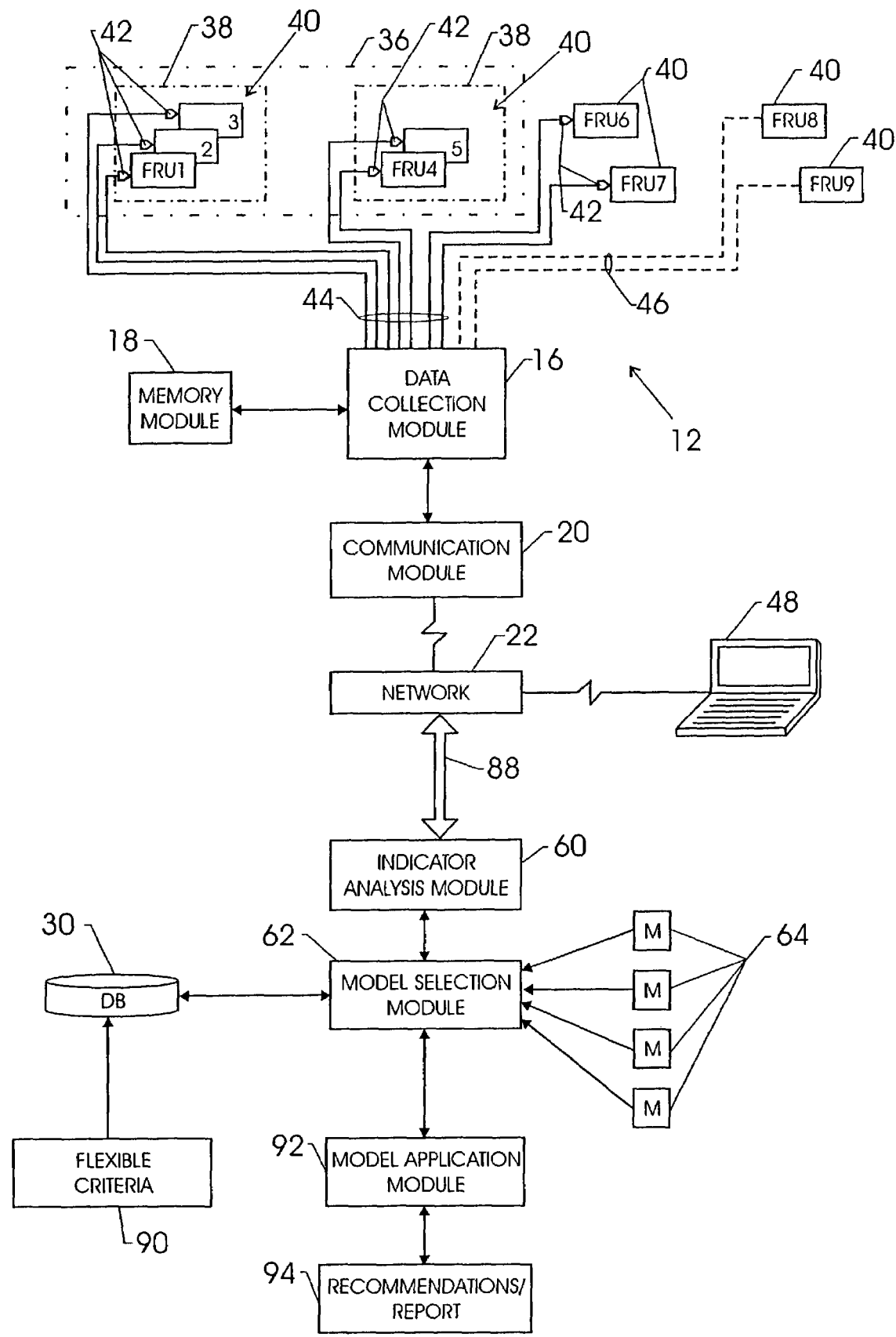
FIG. 4 is a diagrammatical representation of a model selection system for use in providing service to a complex machine system.

The development/evaluation system 26 serves to establish the service model for one or more components or functions of the complex machine system 12. Following such development, however, the service system 10 implements the models for realtime or periodic evaluation of service needs as these arise or on a predictive basis. FIG. 4 represents diagrammatically, such implementation in a present embodiment. As shown in FIG. 4, the complex machine system 12 provides data regarding operation of the various components and functions as detected by sensors 42 or as provided by manual or user communications 46. In general, the data provided from the system will define various indicators which identify particular field replaceable units, components, functions, subsystems, and so forth which may be malfunctioning or in need of current or future service. As described more fully below with reference to the extended FMEA and FISA interfaces shown in FIGS. 6 and 7, a wide range of items and failure modes may be identified in this manner. In developing the models, efforts are made to provide detectability of the various failure modes, as well as the ability to isolate individual components, functions, subsystems or field replaceable units which are likely to have caused the failure modes. Ideally, each failure mode is uniquely identifiable and the cause of the failure modes can be isolated to provide specific recommendations for servicing. Such servicing may take any suitable form, depending upon the nature of the field replaceable unit, component, function, subsystem, or even of the overall system. By way of example, such servicing may take the form of recalibrating components, resetting components, reinitializing components and software, reinstalling software, replacing components, including individual components and field replaceable units, and so forth. The prioritization of the recommendations may follow statistical probabilities, such as defined by a Bayesian network, and may additionally take into account factors discussed above, such as downtime, cost of replaced items, cost of service calls by field engineers and service personnel, transportation and storage costs, and so forth.

The system illustrated diagrammatically in FIG. 4, then, permits for intelligent designation of which service model should be considered in determining the appropriate service recommendation. Specifically, because many such models may exist, and may be implemented at once or over time for a complex machine system, a first challenge exists in determining which of the models might most efficiently address the serviceable event that has occurred or may occur. Accordingly, the indicator analysis module 60 receives data from the complex system 12, either automatically or by prompting the data from the individual components or from the memory module 18. At this stage, the data may be considered as indicator input data represented generally by reference numeral 88 in FIG. 4. As noted above, certain of the data may be sensed while other data may be input manually or by a semi-automated system. Specifically, because not all indicators can be accurately sensed, certain indicators may require judgments, visual inspection, audible inspection, user-initiated detection or analysis routines, and so forth. Similarly, the indicator input data may be received from a service workstation 48 or similar input device. Thus, field engineers, operators, users or other personnel may simply provide raw data, select options from a menu, provide descriptions, and so forth of such occurrences as the appearance of components, odors, exhausts, or any abnormal condition considered as an indicator of a fault or serviceable event.

The indicator analysis module 60 compiles this data and transmits the data to a model selection module 62. The model selection module 62 draws from and stores data within a memory, as indicated generally at reference numeral 30. The model selection module 62 may access one or more models, as represented at reference numeral 64, which correspond, again, to one or more components, functions, subsystems or field replaceable units which could be the root cause of a serviceable event. The model selection module 62 chooses one or more of these models as the basis for compiling service recommendations. In the implementation illustrated in FIG. 4, flexible criteria 90 are determined and stored for use by the model selection module 62. A benefit of the flexible criteria 90 flows from the ability to implement various models, which may themselves be refined over time as described below, and to select between and among the models based upon criteria which themselves may evolve and be refined over time.

The flexible model selection criteria 90 may be implemented by any suitable computer code. In general, simple or highly complex criteria may be employed. In a present embodiment, for example, individual indicators representative of identifiable and isolated root causes for serviceable events are compared with the indicator input collected by the indicator analysis module 60. The input set is then reviewed and compared to the indicators associated with the various service models 64. Correlations between the input set and the indicators are determined, such as by simply matching the number of indicators present in the input set (corresponding in state, value, range, and so forth). The model or models are then chosen from the available set of models based upon such matches. Alternative techniques for the flexible criteria 90 may include weighting of certain indicators, such as to enable greater localization, minimization of cost associated with specific indicators, minimization of costs associated with the type of surface recommendation resulting from the model selection, minimization of cost associated with replacement of specific components or functions, speed of service, and so forth. Other flexible criteria may include criteria based upon belief-based selection systems, and more complex selection algorithms. The flexible criteria 90 are preferably defined by replaceable computer code or code segments so as to facilitate adapting or replacing the criteria as the system becomes better known or as service trends are recognized.

Based upon criteria 90, the model selection module 62 preferably operates in a fully automated fashion to select among the available service models 64 to implement a service strategy. As will be appreciated by those skilled in the art, as the number of models and the complexity of the system increases, the use of an automated model selection module 62 operating on flexible criteria 90 greatly enhances the identification of possible root causes for serviceable events as compared to manual or semi-automated systems. Following selection of the model or models by the model selection module 62, a model application module 92 implements the model to generate one or more service recommendations. The service recommendations may include any or all of the various types of recommendations described above, which may be presented in a prioritized list for addressing the serviceable event. The module 92 then produces recommendations or a report 94 which may generally take the form of the validation report 86 discussed below with reference to FIG. 9. The recommendations and report may be output locally at a location where the model application module is run, or may be transmitted via a network link to a field engineer, or to a location where servicing or service dispatching can be performed. Moreover, it should be understood that any form of "report" may be provided, including notice by any suitable media of the results of the model analysis, such as the need for service actions, service calls, replacement of parts, ordering of parts, shipment of parts, scheduling of service, and so forth. Thus, such notice may be provided to clients, service personnel, service providers, suppliers, and so forth. Media for such reports and notice may include convention telephone or written notice, electronic messages, personal digital assistant notices, and the like.

Figure 5:
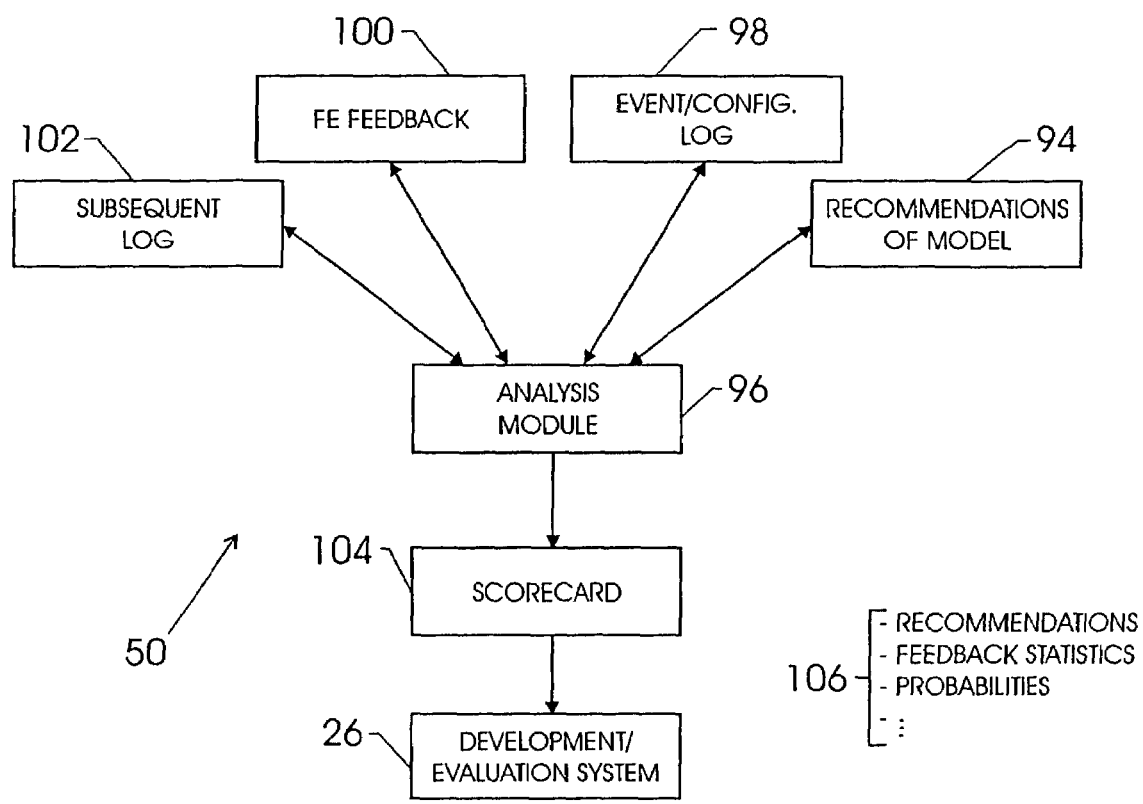
FIG. 5 is a diagrammatical representation of certain functional components in a model analysis and evaluation module for evaluating performance and improving performance of the overall system and models employed by the system.

As noted above, the present techniques also provide for refinement and evaluation of performance of the various models developed and implemented. FIG. 5 provides an overview of various functionalities of the model analysis/evaluation module discussed above with regard to FIG. 2. The module 50 enables identification of the accuracy or performance of the various models and recommendations provided by the service system. In general, the analysis is performed based upon recommendations of the model as determined through the system summarized above with regard to FIG. 4. The recommendations of the individual models are provided to an analysis model 96 where comparisons are performed based upon additional information, which could be indicative of the accuracy or reliability of the model as implemented. In a present implementation, for example, such additional input could originate in event or configuration logs 98 stored in individual system components, subsystems, field replaceable units, or various system memory devices, such as the memory module 18 illustrated in FIG. 1. In complex systems many such event or configuration logs may be available which can be accessed to identify whether subsequent events have transpired, whether configurations have been subsequently changed, whether configurations have been changed during a service call based upon the recommendations, and so forth. Alternatively, or in addition to the event or configuration log 98, feedback may be obtained from field engineers or service technicians as indicated at reference numeral 100. Such feedback may include similar information, including tests performed, configurations changed, items replaced, and so forth. Finally, subsequent logs, which may be the same or similar to the event and configuration logs 98 may be consulted as indicated at reference numeral 102. Such subsequent logs may provide information indicative of additional service needs that were required, additional configuration changes that were made, and so forth.

Analysis module 96 compares these inputs and determines whether the models accurately portray underlying causes of serviceable events. As discussed in greater detail below with respect to FIGS. 10 and 11, not all recommendations will be required or even accurate for addressing and underlying serviceable event. Where a fault occurs, for example, that is due to a different underlying cause than that predicted by the model, such information may be identified by the analysis module 96, such as by analysis of other or additional service tasks performed by service personnel to resolve the serviceable event. Based upon analysis performed by module 96, a report or scorecard 104 may be compiled. Again, the types of reports produced by the analysis module that will be discussed in greater detail below with reference to FIGS. 10 and 11. In general, however, the output or reports represented by scorecard 104 may include recommendation for changes in the models, feedback statistics, probabilities that indicators or combinations of indicators will result from certain items, components, functions, subsystems, field replaceable units or the like, and so forth. Such indications may be provided in any suitable form, such as represented by the simple listing 106 in FIG. 5.

Closing the loop on the entire cycle of the service model development, then, changes can be made to the models via the development/evaluation system 26. In a general sense, such changes may include alteration of the models themselves, such as by inclusion or exclusion of one or more failure modes and one or more indicators. Other changes in the models may include changes in probabilities that certain events or indicators may occur, changes in cost structures, and so forth. It should also be noted that certain changes can be made at this stage as well to the flexible criteria used for selection of the model as discussed above with reference to FIG. 4. Such changes made may be automated, semi-automated or manual procedures.

As described above, the present techniques provide for designing for serviceability of a complex system both concurrent with the system design and subsequently.

FIG. 6 illustrates an exemplary interface for defining a service model in accordance with aspects of the present technique as may be implemented by the system described above. The illustration of FIG. 6 is an extended FMEA interface 68. The interface may be defined in any suitable computer routine, such as in a conventional spreadsheet. The interface translation module 72 and model definition module 74 (see FIG. 3) provide for interfacing the data defined through the interface with modeling software to compile the model based upon the data. In the implementation illustrated in FIG. 6, fields are provided for defining the component or function to which the model corresponds in the system. In the illustrated example, a modality field 110 provides for defining a system modality, such as in the medical diagnostics context. Field 112 provides for identification of the system model, while fields 114 and 116 enable more specific identification of a subsystem and component or function. Other or different system, subsystem, component, functions, field replaceable unit and similar identification fields may be provided.

The interface further provides a number of groups of fields for specifying relevant information used in defining the individual model. For example, in the illustrated embodiment, information is provided by item 118, failure mode 120, service actions 122 and indicators 124. The items provide a breakdown from the component level of individual aspects, features, or sub-components, which can be the root cause of a serviceable event. For each such item, a number of failure modes may be defined. For such failure modes, service actions may be defined which address the individual failure mode. The particular items, which may give rise to the serviceable events, and the individual failure mode, then, may be characterized by one or more indicators. Again, the indicators will generally correspond to data which can be sensed or collected from a system or which can be input manually or in a semi-automated fashion.

Returning to the item information, in the embodiment illustrated in FIG. 6, item data 118 includes an identifier for a particular item, feature or sub-component, as well as a probability associated with that item. The probability, initially assigned by the system or service model designer, represents the probability that the particular item may be associated with a serviceable event for the component for which the service model is being defined. As noted below, such probabilities may be subject to change, and may be improved in accordance with aspects of the present technique overtime based upon the feedback and evaluation described above. Thus, initial probability data may be refined based upon experience gained over time with the same or similar systems and their servicing.

The failure mode data 120 provided in the interface similarly includes an identification 130 of each failure mode, and may include an indication of the severity or criticality of the failure mode, as indicated at reference numeral 132. The severity information may influence the selection of a particular model in evaluating service needs, and may be used in other contexts, such as to define recommended service strategies for addressing the particular failure modes. Moreover, severe failure modes may lead the designer to provide for additional sensors or indicators to offer a high degree of reliability in the detection and localization of such failure modes. The severity factors, coupled with probabilities of the particular failure mode underlying a problem with a particular item, as indicated at reference numeral 134, may serve as the basis for designing for replaceability of individual components, as in field replaceable units, and so forth. The probabilities identified with respect to the various failure modes may be input initially by the system designer, as with the probabilities 128. These probabilities may, of course, be refined over time, as additional information or experience is gained. It should also be noted that the probabilities 134 correspond to the individual failure modes, with multiple failure modes being possible for each identified item.

The service action information 122 provides for definitions of individual actions which may be taken to address various serviceable events, and in particular the failure modes. As noted above, service actions may include calibration, resetting of systems and software, reloading of software, replacement of components, just to name a few. In addition to the identification of the service action 136, costs associated with the actions may be estimated as indicated at reference numeral 138. Such costs may be used as a basis for evaluating certain recommendations, for defining when components should be associated in field replaceable units, for tracking service costs, as the basis for establishing service contract fees, and so forth.

Finally, indicator data 124 provides a range of specifications for the individual data points used to select the particular model of interest in addressing a serviceable event. The data also provides a basis for detecting and localizing potential failures, and for prioritizing service actions. In addition, as described below, the indicators provide the designer with a verifiable basis for evaluating whether certain failure modes can be detected, and where detection is possible, to what extent isolation and localization of individual items in failure modes are facilitated. In the illustrated embodiment, the indicator data 124 includes a message identification 140, where one is present, and a source 142 where the message ID can be found. In many complex systems, for example, log information can be extracted from components and systems which provide the basis for specific identifications of failures or events. Not all items or failure modes will correspond to such logs, however, and certain indicators may not be available from such logs. A name field 144 provides for identifying the particular indicator. As noted above, several types of indicators may be provided, including indicators that are available during normal operation of the system, termed "run time" indicators in FIG. 6, as well as indicators that require user-initiated sequences, and indicators that require manual intervention or input. For the latter two types of indicators, an acquisition time may be identified as indicated at reference numeral 146, and the particular indicator type may be identified at reference numeral 148. This information may be used, in addition, in a design phase to identify points in the process or system in which detectors or sensors may be positioned to enhance serviceability turnaround time and isolation of individual failure modes and items based upon the indicator type.

As noted above, additional interfaces may be provided for defining the service models in accordance with aspects of the present technique. FIG. 7 represents an additional interface of this type. In the Interface 70, information similar to that provided in interface 68 of FIG. 6 is included, but in a different format to which service personnel may be more accustomed. Thus, information providing identification of a modality, system, subsystem, component and so forth may be provided as represented at reference numerals 110, 112, 114 and 116, respectively. Additionally, failure mode identification information 120 is provided, along with service action data 122. Item identification information 118 is similarly provided. As in the case of the interface 68 of FIG. 6, the item information includes both item identification data 126, and probability estimates 128. Similarly, the failure mode data 120 includes identifying information of the failure mode 130, a severity classification 132, and a probability estimate 134. Moreover, identification of particular indicators for specific causes of serviceable events is provided and correlated to the individual service actions, failure modes and items. In the embodiment shown in FIG. 7, a rounded product of the probability estimates 128 and 134 is provided, as indicated at reference numeral 150.

In the view of the interface of 70 of FIG. 7, the interdependence between the individual indicators and the failure modes, service actions and items can be more clearly seen. In particular, the example illustrated in FIG. 7 shows seven separate indicators and nine potential failure modes. It may be noted, for example, that indicator 3 is associated both with failure mode 3 and with failure mode 9, for example, these correlations are summarized in the blocks designated by reference numeral 152 in FIG. 7. The selection of indicators, therefore, can be crafted during the system design such that individual failure modes can be uniquely correlated to specific indicators, and where failure modes are not uniquely distinguishable or isolated, additional indicators may be warranted. Moreover, where cost estimates represent that service actions can be economically combined, indicators may be similarly combined or indicators may be eliminated. Thus, the system provides both for the addition of indicators (such as through the addition of sensors) as well as for the potential reduction of indicators (e.g. reducing the number of sensors required). Similarly, the system enables the designer to provide feedback to system designers for inclusion of components or functions into combined field replaceable units which can be economically replaced in the event of specific failure modes or items.

Figure 8:
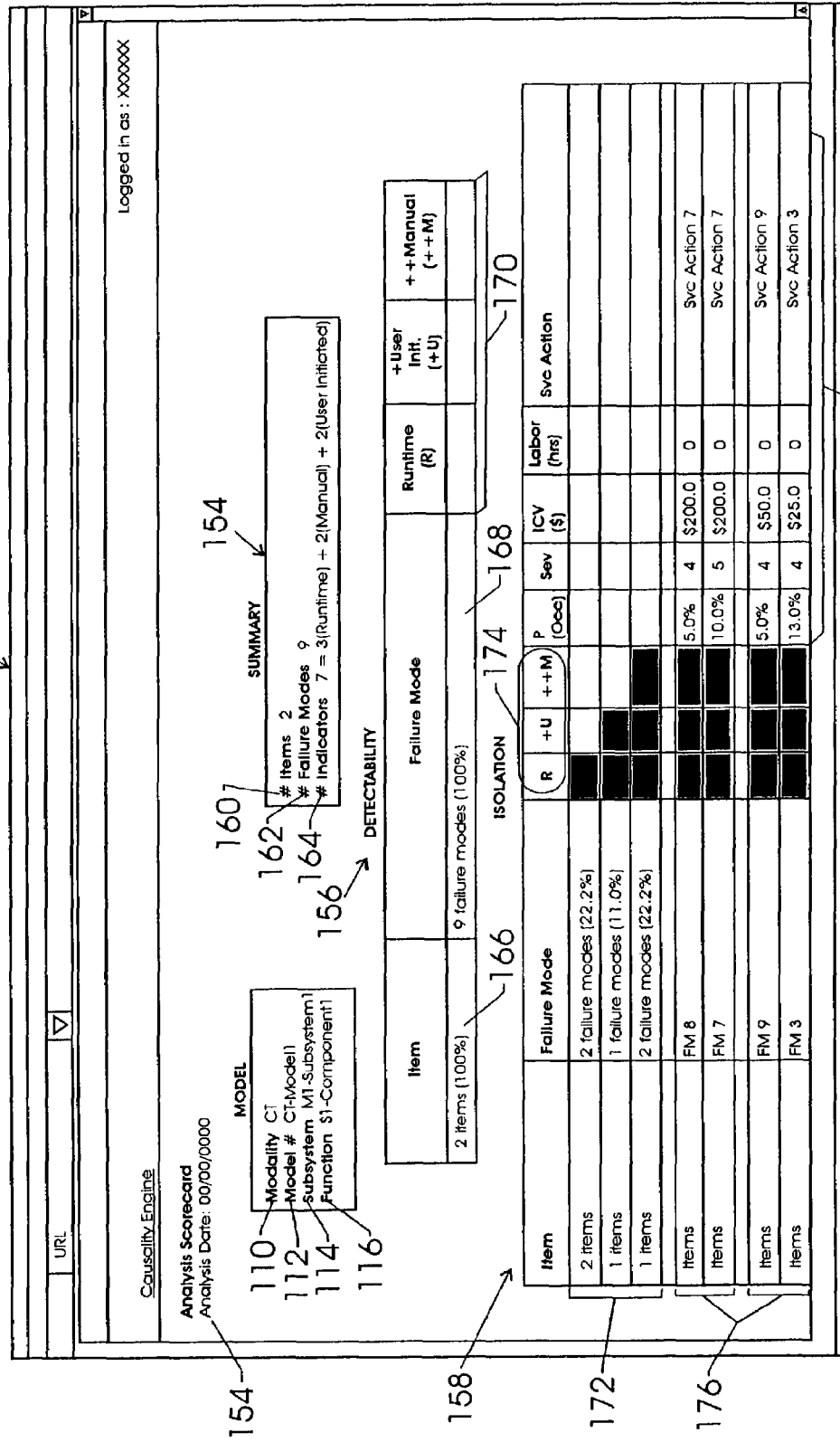
FIG. 8 is an exemplary implementation of an analysis scorecard for evaluating a service model during a design phase.

As noted above, based upon the model definition provided by the interfaces 68 and 70 of FIGS. 6 and 7, and upon the model definition module and software described above with reference to FIG. 3, a model is developed and can be evaluated. In a present embodiment, an analysis scorecard 84 is developed as illustrated in FIG. 8. In the illustrated embodiment, the scorecard provides identification information for the particular model corresponding to that input by the designer, as indicated at reference numerals 110, 112, 114 and 116. A general summary 154 of the model analysis and output is also provided. In the illustrated example, corresponding to the model defined by interfaces 68 and 70 of FIGS. 6 and 7, respectively, two individual items are analyzed (see data 126 in FIGS. 6 and 7), as are nine separate failure modes (see data 130 in FIGS. 6 and 7), based upon seven separate indicators (see data 144 in FIGS. 6 and 7). These items are summarized as indicated at reference numerals 160, 162 and 164 in FIG. 8. Moreover, an identification of the type of indicators employed by the model is summarized.

The scorecard also summarizes the detectability of the various items and failure modes. The detectability, summarized at reference numeral 156 in FIG. 8 includes a summary of the number of items involved and the percentage of those items for which failure is detectable, as indicated at reference numeral 166, as well as a tabulation of the number of failure modes involved in their percentage detectability, as summarized at reference numeral 168. In the embodiment illustrated in FIG. 8, in addition, some representation is provided for the types of indicators involved in detecting the failure of items and failure modes in the model, as indicated at reference numeral 170.

In the illustrated embodiment, the scorecard further summarizes the degree to which isolation of the failure of the items and the occurrence of the failure modes can be made in accordance with the model. The isolation summary, represented at reference numeral 158 in FIG. 8, includes, in the illustrated embodiment, a summary of the particular items involved, their various failure modes, and the types of indicators required for their isolation, as indicated at reference numeral 172. Items and failure modes in summary 172 offer accurate fault isolation. Moreover, summaries of the individual items and their failure modes which can not be accurately isolated are provided, as indicated at reference numeral 176, in association with the probability of occurrence data, severity, cost, and service action data input via the model design interface, as indicated at reference numeral 178.

It should be noted that the analysis and evaluation available by virtue of the present techniques enables informed decisions as to recommendations of service actions, as well as for design of the system itself. For example, as can be noted in the example of FIG. 8, failure modes 7 and 8 (FM7 and FM8) are both addressed by service action 7, such as the replacement of a part of field replaceable unit. That being the case, the system designer may recognize that there is no need for isolation of failure modes 7 and 8 (as the response to both is the same). Indicators and associated sensors for such isolation could then be eliminated, at least as far as service needs are concerned (information from such sensors could, of course, be useful for other reasons in the system).

Similarly, while failure modes 3 and 9 are isolated and have different service actions, in view of the relative low cost of such responses (see ICV column in the interface of FIG. 8), a recommendation may be made in either case to respond by both service actions (e.g. ship both parts for replacement). In such cases, supply of a potentially unneeded part may be justified in view of its low cost as compared to the potential cost of providing an indicator and associated sensor for isolating the failure modes from one another. On the other hand, if costs and costs differences are greater, the additional indicator and sensor may be warranted.

Figure 9:
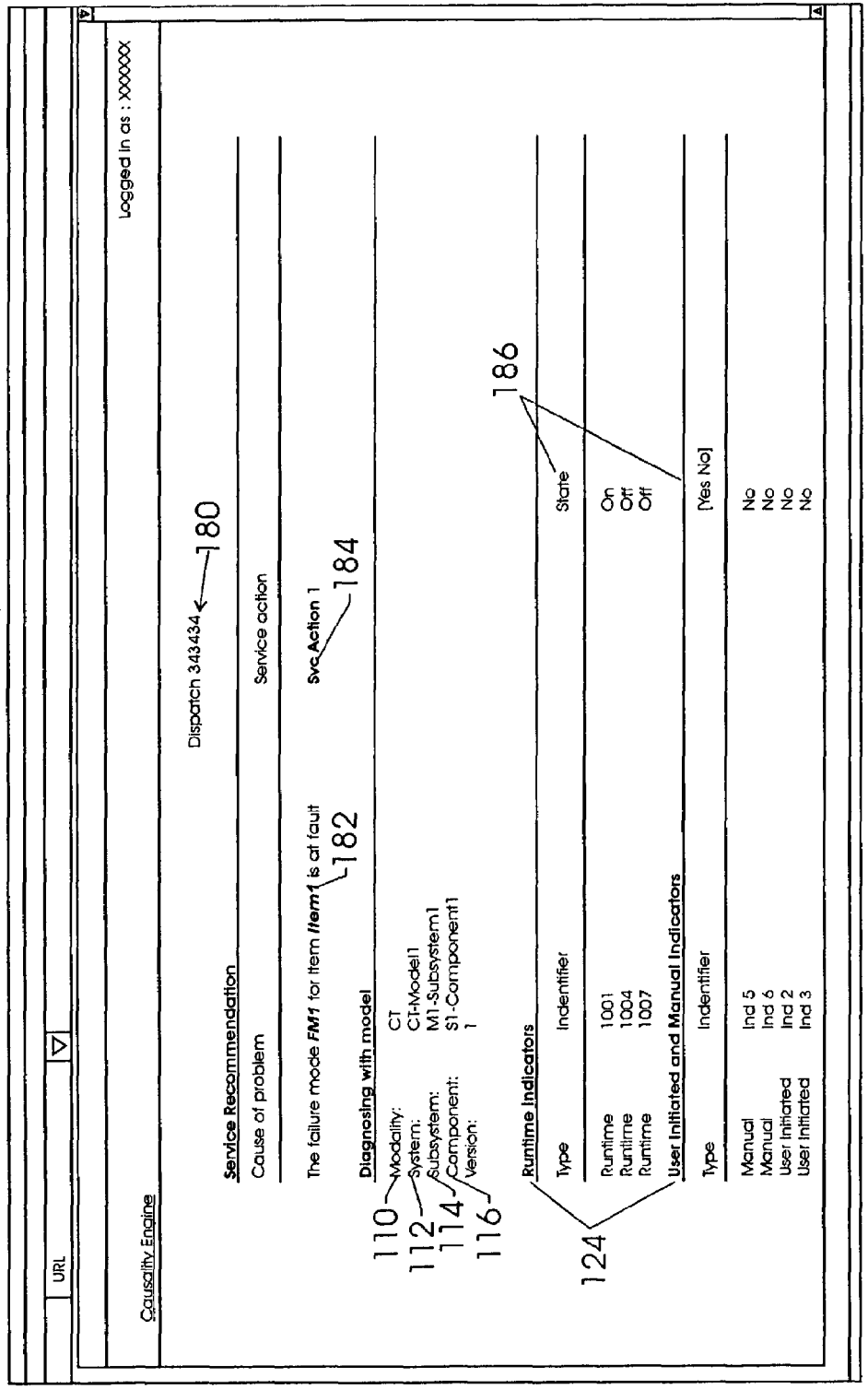
FIG. 9 is an exemplary implementation of a diagnosis analytical tool used to evaluate service models during the validation and diagnostic phases.

The analysis scorecard may be used in conjunction with other reports and output documents to analyze whether the model sufficiently characterizes and isolates individual root causes of serviceable events. A second output format is represented in FIG. 9 in the form of a diagnostics report. The validation report 86 identified a particular dispatch or service order 180. Based upon the indicators evaluated for the particular service model, and upon the correspondence of these indicators with the individual item and failure modes identified, a probable cause of a serviceable event is identified as indicated at reference numeral 182 in FIG. 9. As noted above, such causes are then associated with service actions, the recommendation for which is provided at reference numeral 184. Where desired, a list of possible service actions of this type may be provided with corresponding causes. The list may also be prioritized based upon such factors as probability, past experience, cost, service turnaround time, and so forth.

The presentation includes an identification of the particular model used for the analysis, following identification designations made in the design of the model. In the illustrated embodiment, these include identifications of a modality, system, subsystem, and component as indicated at reference numerals 110, 112, 114 and 116. Other types of model or system component identification could, of course, be used further, because different indicators will typically be present in various states, the states of these indicators is called out through a listing of the indicators, as illustrated at reference numeral 186. As noted above, in a present embodiment, such indicators may be designated as "run time" indicators, data from which can be collected during normal operation of the system, as well as user-initiated indicators and manual indicators. In the illustrated embodiment, a single indicator 1001 appears to be in the on state, while all other indicators are either off or negative.

The validation report 86 may be used during initial design of the service system, such as to test or analyze the performance of various service models. Moreover, the same or similar reports may be generated as a result of the detection of serviceable events. Such events may occur during the life of the system, and the analysis may be triggered in various manners, such as automatically, by user intervention, on periodic bases, and so forth. In general, such diagnostic reports will be generated to summarize recommendations following detection of specific indicators, selection of one or more service models, application of the service model to the indicator input data, and subsequent analysis through the procedures described above.

Figure 10:
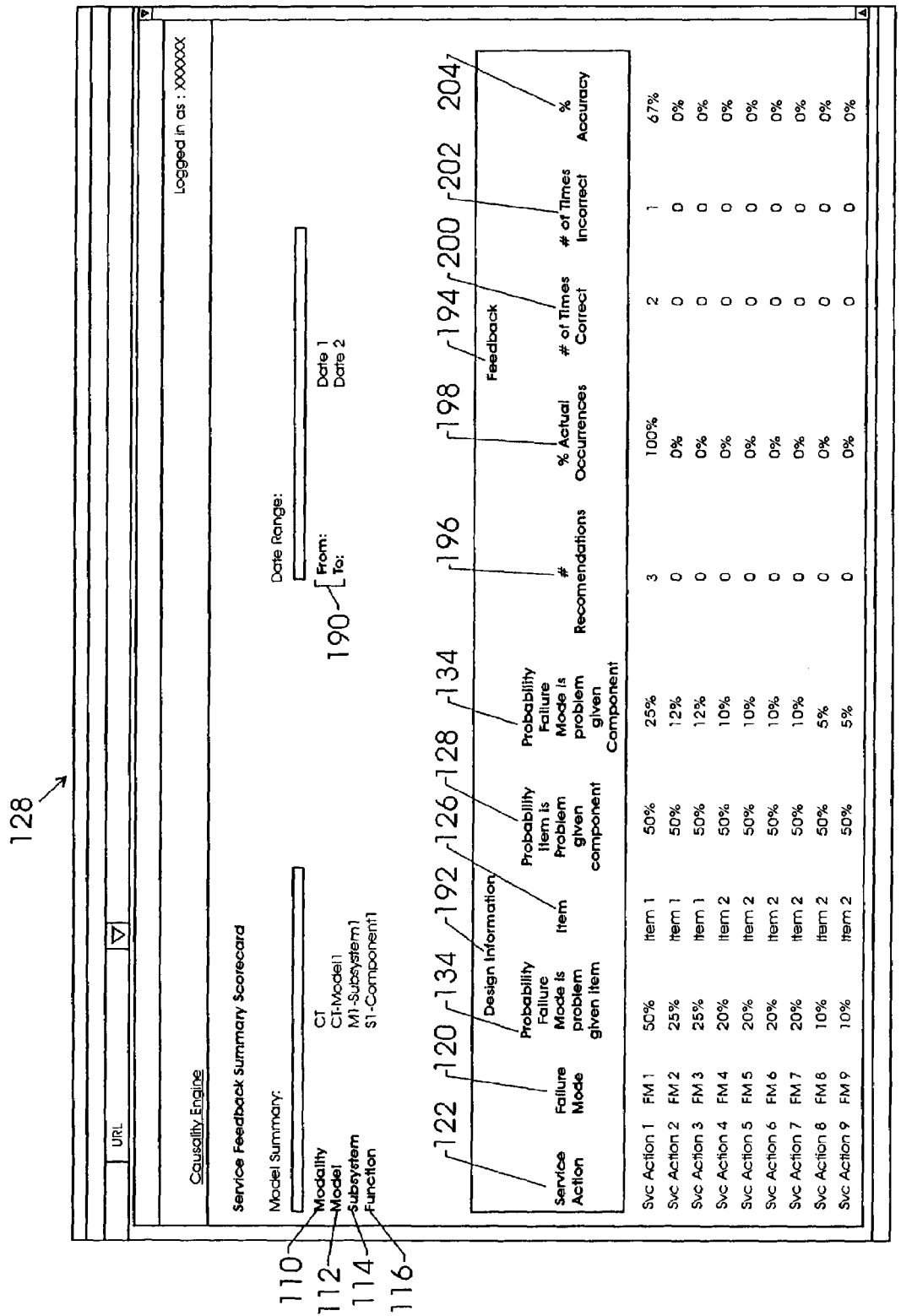
FIG. 10 is an exemplary presentation of a service feedback scorecard providing a summary of the effectiveness and accuracy of particular models and recommendations made for servicing based upon the models.

As noted above, the present techniques also afford improvement of the service models and the overall service system over time. Specifically, as additional experience is gained through actual servicing of the system, this information is gleaned for use in analyzing the accuracy and effectiveness of the existing models, and for changing the existing models or the machine system to enhance serviceability. FIG. 10 illustrates an exemplary service feedback scorecard that can be generated through the various modules summarized above with reference to FIG. 3. In the illustrated embodiment, the scorecard 188 includes an identification of the particular model being evaluated, such as by fields 110, 112, 114 and 116 mentioned above. Because the feedback is provided on the basis of actual service rendered, a date range is specified as indicated at reference numeral 190. Various service actions possible in the model, in addition to failure modes, design information, probabilities, and so forth, are displayed as indicated in FIG. 10. This information will generally include that information which is used to establish the model as described above. In addition, however, actual data relating to service performed on a system is also provided. Feedback data 194 is provided including various fields. As indicated at reference numeral 196, for example, the number of recommendations within the date range for a specific service actions (corresponding to failure modes of specific items) is indicated. In the illustrated embodiment, three recommendations had been made for the date range based upon service action 1. A percentage of actual occurrences is listed as indicated at reference numeral 198, in the illustrated embodiment all occurrences having involved service action 1. The feedback also includes an indication of the number of times the recommendation was correct and the number of times the recommendation was incorrect, as indicated by reference numerals 200 and 202. Based upon these counts, a percent accuracy of the model is indicated at reference numeral 204. In general, the scorecard provides a summary of service actions that were taken based upon application of the specific model being considered. Where the actions taken corresponded correctly to the actions needed, typically determined by service personnel, all occurrences will appear as correct. However, where occurrences appear as incorrect, this may be considered an indication that some change may be required in the model, such as to identify other root causes of serviceable events, distinguish between causes for such events, provide for enhanced isolation between the root causes, and so forth.

More detail information may be provided, where desired, through detail scorecards of the type illustrated in FIG. 11. In the detailed scorecard indicated generally by reference numeral 206, similar system component designation information is provided as indicated by fields 110, 112, 114 and 116. A date range for service activities is also indicated, in a manner similar to that illustrated in FIG. 10, as indicated by reference numeral 190. However, the detailed scorecard 206 provides information on the specific service recommendations made during the date range. In the illustrated embodiment, it will be noted that service action 1 was recommended three times during the date range as shown by the number of recommendations column 196 in FIG. 10. In the detailed scorecard of FIG. 11, then, the same three incidents are detailed in entries 208. The entries include details regarding the date and time, the dispatch number, the service action and the failure mode addressed. The information further includes details relating to whether the service action was correct, as indicated at reference numeral 210. Further, the correct action is noted as indicated at reference numeral 212. Such information is highly useful in evaluating whether the service model has correctly identified the failure mode and associated the failure mode with the required service action. Again, the correct service action can be identified either by human input, such as by field engineer, or by automatic detection of changes in system configurations, altered to changed equipment, and so forth. The detailed scorecard, in the illustrated embodiment, also provides an indication of the particular indicators present in each case, and their state, as summarized at reference numeral 214. This information may service the basis for evaluating whether an additional or different failure mode and accompanying service action may be specified, or the existing definitions may be corrected or modified. The feedback may also provide an indication that insufficient detection or isolation is provided by the existing models, and that one or more additional indicators or models would be useful in providing the desired service. Similarly, the information may provide an indication of whether the probabilities employed by the model, which serve as the basis for evaluating which failure mode is more likely for individual items and for components is accurate. Over time, the summary and detailed scorecards provide an extremely useful tool for the improvement of service models and a selection of such models.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for selecting a service model from a plurality of service models comprising:
   accessing input data from a plurality of components of a complex system in response to a serviceable event;
   comparing the input data to corresponding indicators for a plurality of service models for the plurality of components; and
   selecting a service model from the plurality of service models for determination of a service action on a corresponding one of the components in response to the serviceable event based upon the comparison.

2. The method of claim 1, wherein the service model is selected based upon a number of matches between the input data and indicators for each of the service models.

3. The method of claim 1, wherein the service model is selected based upon weighting of indicators for each of the service models.

4. The method of claim 1, wherein the input data includes data representative of operational parameters of the complex system automatically collected by sensors associated with the plurality of components.

5. The method of claim 1, wherein the input data includes data representative of operational parameters of the complex system manually collected.

6. The method of claim 1, wherein the at least one service model is selected based upon selection criteria stored in a memory device.

7. The method of claim 6, wherein the selection criteria are stored in the memory device as a replaceable software module.

8. The method of claim 1, comprising identifying a recommended service action based upon the selected model.

9. The method of claim 8, comprising comparing the input data to the indicators for identification of the recommended service action.

10. A method for selecting a service model from a plurality of service models comprising:
    accessing input data from a plurality of components of a complex system in response to a serviceable event;

comparing the input data to corresponding indicators for a plurality of service models for the plurality of components; and selecting a service model from the plurality of service models for determination of a service action on a corresponding one of the components in response to the serviceable event based upon a number of matches between the input data and indicators for each of the service models.

11. The method of claim 10, wherein the service model is selected based upon weighting of indicators for each of the service models.

12. The method of claim 10, wherein the input data includes data representative of operational parameters of the complex system automatically collected by sensors associated with the plurality of components.

13. The method of claim 10, wherein the input data includes data representative of operational parameters of the complex system manually collected.

14. The method of claim 10, wherein the at least one service model is selected based upon selection criteria stored in a memory device.

15. The method of claim 14, wherein the selection criteria are stored in the memory device as a replaceable software module.

16. The method of claim 10, comprising identifying a recommended service action based upon the selected model.

17. The method of claim 16, comprising comparing the input data to the indicators for identification of the recommended service action.

18. A method for identifying a service action from a plurality of service models comprising:

accessing input data from a plurality of components of a complex system in response to a serviceable event;

comparing the input data to corresponding indicators for a plurality of service models for the plurality of components;

selecting a service model from the plurality of service models for determination of a service action on a corresponding one of the components in response to the serviceable event based upon a number of matches between the input data and indicators for each of the service models; and identifying a recommended service action based upon the selected model.

19. The method of claim 18, comprising comparing the input data to the indicators for identification of the recommended service action.

20. The method of claim 18, wherein the service model is selected based upon weighting of indicators for each of the service models.

21. The method of claim 18, wherein the input data includes data representative of operational parameters of the complex system automatically collected by sensors associated with the plurality of components.

22. The method of claim 18, wherein the input data includes data representative of operational parameters of the complex system manually collected.

23. The method of claim 18, wherein the at least one service model is selected based upon selection criteria stored in a memory device.

24. The method of claim 23, wherein the selection criteria are stored in the memory device as a replaceable software module.

25. A system for selecting a service model from a plurality of service models comprising a storage device for storing a plurality of service models defining to service actions responsive to serviceable events;

a set of selection criteria for selection of models of the plurality of service models based upon indicators associated with each of the models; and a model selection module configured to select at least one of the models based upon input data from a complex system and upon the selection criteria.

26. The system of claim 25, wherein the model selection module forms a Bayesian network.

27. The system of claim 25, comprising a network link for accessing input data from the complex system.

28. The system of claim 25, wherein the service model is selected based upon a number of matches between the input data and indicators for each of the service models.

29. The system of claim 25, wherein the service model is selected based upon weighting of indicators for each of the service models.

30. The system of claim 25, wherein the input data includes data representative of operational parameters of the complex system automatically collected by sensors associated with a plurality of components.

31. The system of claim 25, wherein the input data includes data representative of operational parameters of the complex system manually collected.

32. The system of claim 25, wherein the selection criteria are stored in the memory device as a replaceable software module.

33. A system for selecting a service model from a plurality of service models comprising:

means for accessing input data from a plurality of components of a complex system in response to a serviceable event;

means for comparing the input data to corresponding indicators for a plurality of service models for the plurality of components; and means for selecting a service model from the plurality of service models for determination of a service action on a corresponding one of the components in response to the serviceable event based upon the comparison.

34. A system for selecting a service model from a plurality of service models comprising:

means for accessing input data from a plurality of components of a complex system in response to a serviceable event;

means for comparing the input data to corresponding indicators for a plurality of service models for the plurality of components; and means for selecting a service model from the plurality of service models for determination of a service action on a corresponding one of the components in response to the serviceable event based upon a number of matches between the input data and indicators for each of the service models.

35. A system for identifying a service action from a plurality of service models comprising:

means for accessing input data from a plurality of components of a complex system in response to a serviceable event;

means for comparing the input data to corresponding indicators for a plurality of service models for the plurality of components;

means for selecting a service model from the plurality of service models for determination of a service action on a corresponding one of the components in response to the serviceable event based upon a number of matches between the input data and indicators for each of the service models; and means for identifying a recommended service action based upon the selected model.

36. A computer program for selecting a service model from a plurality of service models comprising:

at least one machine readable medium for storing computer code; and computer code stored on the media for performing a series of routines including accessing input data from a plurality of components of a complex system in response to a serviceable event, comparing the input data to corresponding indicators for a plurality of service models for the plurality of components, and selecting a service model from the plurality of service models for determination of a service action on a corresponding one of the components in response to the serviceable event based upon the comparison.

37. A computer program for selecting a service model from a plurality of service models comprising:

at least one machine readable medium for storing computer code; and computer code stored on the media for performing a series of routines including accessing input data from a plurality of components of a complex system in response to a serviceable event, comparing the input data to corresponding indicators for a plurality of service models for the plurality of components, and selecting a service model from the plurality of service models for determination of a service action on a corresponding one of the components in response to the serviceable event based upon a number of matches between the input data and indicators for each of the service models.

38. A computer program for identifying a service action from a plurality of service models comprising:

at least one machine readable medium for storing computer code; and computer code stored on the media for performing a series of routines including accessing input data from a plurality of components of a complex system in response to a serviceable event, comparing the input data to corresponding indicators for a plurality of service models for the plurality of components, selecting a service model from the plurality of service models for determination of a service action on a corresponding one of the components in response to the serviceable event based upon a number of matches between the input data and indicators for each of the service models, and identifying a recommended service action based upon the selected model.

* * * * *